(12) United States Patent
Altenhof-Long et al.

(10) Patent No.: US 7,263,218 B2
(45) Date of Patent: Aug. 28, 2007

(54) DYNAMIC GENERATION OF COLOR LOOK-UP TABLES

(75) Inventors: Cameron Altenhof-Long, Vancouver, WA (US); Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/740,395

(22) Filed: Dec. 22, 2003

(65) Prior Publication Data

US 2005/0135672 A1 Jun. 23, 2005

(51) Int. Cl.
*G06K 9/00* (2006.01)

(52) U.S. Cl. .................. 382/162; 382/167; 358/1.9

(58) Field of Classification Search ........ 382/162–167, 382/300; 358/1.9, 2.1, 3.23, 504, 515–525; 345/589–604, 503; 708/290
See application file for complete search history.

(56) References Cited

U.S. PATENT DOCUMENTS

| | | | | |
|---|---|---|---|---|
| 4,275,413 A | | 6/1981 | Sakamoto et al. .......... | 358/525 |
| 4,511,989 A | | 4/1985 | Sakamoto ................... | 708/290 |
| 5,481,655 A | | 1/1996 | Jacobs ........................ | 358/1.9 |
| 5,625,378 A | * | 4/1997 | Wan et al. ................... | 345/600 |
| 5,719,956 A | | 2/1998 | Ogatsu et al. .............. | 382/167 |
| 5,734,800 A | * | 3/1998 | Herbert et al. ............... | 358/1.9 |
| 5,786,908 A | | 7/1998 | Liang .......................... | 358/518 |
| 5,903,665 A | * | 5/1999 | Tanaka ....................... | 382/162 |
| 6,184,894 B1 | | 2/2001 | Rosman et al. ............. | 345/582 |
| 6,204,855 B1 | | 3/2001 | Khaund ...................... | 345/589 |
| 6,333,743 B1 | | 12/2001 | Gossett et al. .............. | 345/503 |
| 6,335,800 B1 | | 1/2002 | Balasubramanian ........ | 358/1.9 |
| 6,441,923 B1 | * | 8/2002 | Balasubramanian et al. ......................... | 358/3.23 |
| 6,587,117 B1 | | 7/2003 | Wright et al. ............... | 345/601 |
| 7,019,868 B2 | * | 3/2006 | Chang et al. ................ | 358/2.1 |

OTHER PUBLICATIONS

Kang, Henry, "Color Technology for Electronic Imaging Devices", SPIE 1997 (ISBN 0-8194-2108-1), pp. 70-72.
Shepard, Donald, "A two-dimensional interpolation function for irregularly-spaced data", Proceedings of the 23rd ACM National Conference, pp. 517-524 (1968).
Hung, Po-Chieh, "Colorimetric calibration in electronic imaging devices using a look-up table model and interpolations", Journal of Electronic Imaging 2(1), pp. 53-61 (Jan. 1993).
Amidror, Issac, "Scattered data interpolation methods for electronic imaging systems: a survey", Journal of Electronic Imaging 11(2), pp. 157-176 (Apr. 2002).

* cited by examiner

*Primary Examiner*—Ishrat Sherali
(74) *Attorney, Agent, or Firm*—Fitzpatrick, Cella, Harper & Scinto

(57) ABSTRACT

Creating a look-up table which converts color image data from a device-independent color space to a device-dependent color space, by determining a range of lightness values corresponding to a lightness value of a target data point in device-independent color space, searching a predetermined set of data points in device-independent color space to obtain a selected set of data points, each selected data point having a lightness value within the determined range of lightness values and having corresponding device-dependent component values within a predetermined tolerance level of the component values of a previously-determined device-dependent data point, performing a weighted interpolation on the device-dependent component values corresponding to the selected set of data points to calculate an interpolated data point which is in device-dependent color space, and entering the interpolated device-dependent data point into a look-up table entry corresponding to the device-independent target data point.

4 Claims, 13 Drawing Sheets

| K 210 | RANGE 211 | CMY 212 |
|---|---|---|
| 0%–20% | 0%–10% | Every 1% step |
| | 10%–20% | Every 2% step |
| | 20%–100% | Every 5% step |
| 20%–40% | 0%–40% | Every 5% step |
| | 40%–100% | Every 10% step |
| 45%–100% | Every 10% step | |

FIG. 9

DYNAMIC GENERATION OF COLOR LOOK-UP TABLES

BACKGROUND OF THE INVENTION

1. Field of the Invention

The present invention relates to a color management system for dynamically generating, based on provided color measurement data, forward and inverse transformation look-up tables for transforming color image data between device-dependent and device-independent color spaces.

2. Description of the Related Art

Typically, color management systems rely on predetermined look-up tables for the conversion of color image data between device-dependent and device-independent color spaces. Such predetermined look-up tables are often created by the developer of a color management module for a given color device, such as a printer. Accordingly, a user is generally unable to modify them or update them if the color characteristics of the color device are different from, or have changed from, the representation of the color device by the look-up tables.

In order to generate a forward look-up table for converting from device-dependent to device-independent color space, an IT8.7/3 target containing CMYK patches is widely used in the art. The CMYK patches consist of sampling of the CMYK space in a well-defined manner so that a rectangular grid (with non-uniform spacing in C, M, Y and K) is formed. Each patch is then measured with a calorimeter or spectrophotometer. The measurements, which are typically in CIEXYZ values, then form a Look-Up Table (LUT), with which an empirical model of the printer can be built using an interpolation method of one's choice, resulting in the forward look-up table.

However, the inversion of the printer model to generate an inverse look-up table for converting from device-independent to device-dependent color space presents more difficulties. Given an input color in CIELAB or more generally, a color appearance space, there is a question of whether this color is within the printer gamut. There is also the issue regarding the arrangement of points in the color appearance space. While the CMYK values can be arranged to fall on a rectangular grid, as is done in the IT8.7/3 target, the same cannot be said of the resulting printed colors as they are situated in the color appearance space. In general, they are scattered in the color appearance space with no particular pattern.

In this regard, there are generally two known approaches to the inversion problem regarding scattered points. One approach is to use a geometric subdivision of the printer gamut using elementary 3-dimensional solids, such as tetrahedra. A subdivision of the printer gamut in the device-independent (color appearance) space can be induced from the corresponding subdivision of the device-dependent (CMYK) space. This approach has the advantage of computational simplicity. In the case of a tetrahedron, only four points are used in an interpolation. On the other hand, the result depends heavily on a just few points, which means that a measurement error will have a significant deleterious effect on the result. In addition, the interpolant also tends to be not very smooth because of the low number of points involved.

The second known approach does not assume any subdivision at all, but is instead based on the technique of scattered data interpolation. A classical example is the technique of Shepard interpolation, or inverse weighted method. In this method, several points surrounding the input point are chosen and each assigned a weight, usually inversely proportional to the distance, and the interpolant is taken as the weighted average of the neighboring points. In this approach, the choice of neighboring points is paramount to performance of the result. While too few neighboring points would render the interpolant inaccurate and non-smooth, too many points would impose a high computational cost, as the weights are typically non-linear functions and costly to compute, thereby rendering the second approach less feasible in a dynamic, run-time environment.

SUMMARY OF THE INVENTION

The present invention addresses the foregoing problems by providing a color management system which dynamically generates, based on provided color measurement data, forward and inverse transformation look-up tables for transforming color image data between device-dependent and device-independent color spaces, by using fewer interpolation points, but still resulting in a smooth interpolant.

According to one embodiment of the invention, a look-up table is created which converts color image data from a device-independent color space to a device-dependent color space. The look-up table is created by determining a range of lightness values corresponding to a lightness value of a target data point in device-independent color space, searching a predetermined set of data points in device-independent color space to obtain a selected set of data points, each selected data point having a lightness value within the determined range of lightness values and having corresponding device-dependent component values within a predetermined tolerance level of the component values of a previously-determined device-dependent data point, performing a weighted interpolation on the device-dependent component values corresponding to the selected set of data points to calculate an interpolated data point which is in device-dependent color space, and entering the interpolated device-dependent data point into a look-up table entry corresponding to the device-independent target data point.

Preferably, the look-up table is populated in a particular order starting with a black data point at the center of the table, populating the rest of the neutral axis, populating outward along the a-axis, and then populating all data points outward along the b-axis. Also, the predetermined set of data points is preferably obtained from a list of data point pairs, each data point pair containing a device-independent data point and a corresponding device-dependent data point, where the list of data points is obtained by sampling a forward look-up table according to a predetermined schedule. Also preferably in the searching step, the tolerance level is increased until eight data points are selected.

By virtue of this arrangement, a color management system is provided which dynamically generates, based on provided color measurement data, an inverse transformation look-up table for transforming color image data from a device-independent to a device-dependent color space, by using fewer number of interpolation points while still resulting in a smooth interpolant.

According to another embodiment of the invention, a look-up table is created which converts color image data from a device-dependent color space to a device-independent color space. The look-up table is created by determining an upper black component value which is a predetermined amount above a target black component value of a device-dependent target data point, and a lower black component value which is a predetermined amount below the target black component value of the device-dependent target data point, accessing a color measurement data table which contains device-independent component values in respective correspondence to device-dependent data points, selecting, from the color measurement data table, an upper set of device-dependent data points which are within the vicinity of the device-dependent target data point at the upper black component value, and a lower set of device-dependent data points which are within the vicinity of the device-dependent target data point at the lower black component value, creating a first new set of device-dependent data points, each of which having a black component value equal to the upper black component value and having a combination of color component values corresponding to a respective one of the selected lower set of device-dependent data points, creating a second new set of device-dependent data points, each of which having a black component value equal to the lower black component value and having a combination of color component values corresponding to a respective one of the selected upper set of device-dependent data points, interpolating, for each of the first new set of device-dependent data points, device-independent component values that correspond to immediately adjacent device-dependent data points from the selected upper set of device-dependent data points, to obtain an interpolated device-independent data point at the upper black component level, interpolating, for each of the second new set of device-dependent data points, between device-independent component values that correspond to immediately adjacent device-dependent data points from the selected lower set of device-dependent data points, to obtain an interpolated device-independent data point for the corresponding new device-dependent data points, and interpolating between the device-independent component values which correspond to each of the selected upper set of device-dependent data points, the first new set of device-dependent data points, the selected lower set of device-dependent data points and the second new set of device-dependent data points, to obtain an interpolated device-independent data point corresponding to the device-dependent target data point.

Preferably, the color measurement data table is based on device-independent color data measured from a device-dependent colorant test target. The first and second interpolation steps are preferably performed by using a three-dimensional tetrahedral interpolation method. The third interpolation step is preferably performed by using a four-dimensional tetrahedral interpolation method.

By virtue of this arrangement, a color management system is provided which dynamically generates, based on provided color measurement data, a forward transformation look-up table for transforming color image data from a device-independent to a device-dependent color spaces by using fewer interpolation points but still resulting in a smooth interpolant.

According to yet another embodiment of the invention, a color management method is provided for converting color image data between a device-independent color space and a device-dependent color space. The method includes the steps of generating a forward look-up table which converts color image data from the device-dependent color space to the device-independent color space, the forward look-up table being generated based on measured device-independent component values corresponding to device-dependent color target samples, and sampling the forward look-up table for device-dependent data points according to a sampling schedule, to obtain corresponding device-independent data points, and placing the device-dependent data points and corresponding device-independent data points in a data pair list. The method further includes generating an inverse look-up table which converts color image data from the device-independent color space to the device-dependent color space, by, for each one of a plurality of target data points in device-independent color space, determining a range of lightness values corresponding to a lightness value for each target data point, searching the data pair list to obtain a selected set of data points, each selected data point having a lightness value within the determined range of lightness values and having corresponding device-dependent component values within a predetermined tolerance level of the component values of a previously-determined device-dependent data point, performing a weighted interpolation on the device-dependent component values corresponding to the selected set of data points to calculate an interpolated data point which is in device-dependent color space, and entering the interpolated device-dependent data point into an entry in the inverse look-up table corresponding to the device-independent target data point. Lastly, the method also includes converting a device-independent target data point to the device-dependent color space by accessing the nearest device-independent data point entries in the inverse look-up table relative to the device-independent target data point, and performing a cubic interpolation on the device-dependent data points obtained from the inverse look-up table which correspond to the nearest device-independent data point entries.

Preferably, the look-up table is populated in a particular order starting with a black data point at the center of the table, populating the neutral axis, populating outward along the a-axis, and then populating all data points outward along the b-axis. Also, the list of data point pairs is preferably obtained by sampling a forward look-up table according to a predetermined graduated schedule. Also preferably in the searching step, the predetermined tolerance level is increased until eight data points are selected.

By virtue of this arrangement, a color management system is provided which dynamically generates, based on provided color measurement data, an inverse transformation look-up table for transforming color image data from a device-independent to a device-dependent color space, by using fewer number of interpolation points but still resulting in a smooth interpolant.

This brief summary has been provided so that the nature of the invention may be understood quickly. A more complete understanding of the invention can be obtained by reference to the following detailed description of the preferred embodiment thereof in connection with the attached drawings.

BRIEF DESCRIPTION OF THE DRAWINGS

FIG. 9 is a diagram which depicts a sampling schedule in the generation of a table of data points according to one embodiment of the present invention.

DETAILED DESCRIPTION OF THE PREFERRED EMBODIMENTS

The present invention is generally directed to a color management system which dynamically generates, based on provided color measurement data, forward and inverse transformation look-up tables for transforming color image data between device-dependent and device-independent color spaces, by using fewer number of interpolation points but still resulting in a smooth interpolant in this manner, high-quality transformation look-up tables can be generated from measurement data when needed, without resulting in the excessive use of computational resources. The present invention may be implemented in an color management module, such as in a color management software application module for use in a general purpose computer. It can be appreciated that the present invention is not limited to the aforementioned embodiments and that the present invention may be implemented in other forms as well, such as in a programmed color management device.

Figure 1:
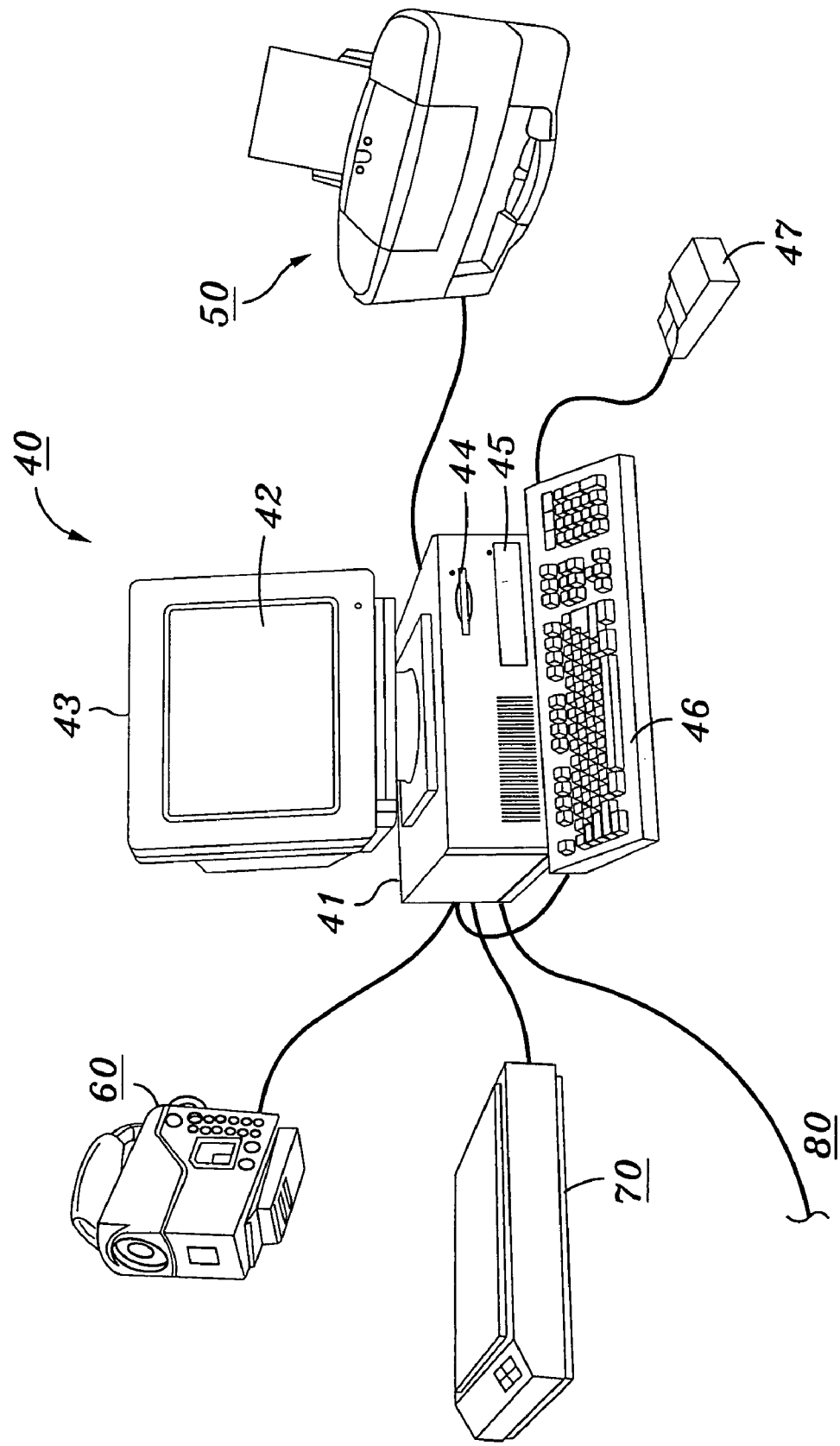
FIG. 1 is a representative view of a computing environment in which the present invention may be implemented.

FIG. 1 is a view showing the external appearance of a representative computing system including computing equipment, peripherals and digital devices which may be used in connection with the practice of the present invention. Computing equipment 40 includes host processor 41 which comprises a personal computer (hereinafter "PC"), preferably a personal computer having a windows-based operating system, although it may be another type computer having a non-windows-based operating system. Provided with computing equipment 40 are color monitor 43 including display screen 42, keyboard 46 for entering text data and user commands, and pointing device 47. Pointing device 47 preferably comprises a mouse for pointing and for manipulating objects displayed on display screen 42.

Computing equipment 40 includes a computer-readable memory medium such as computer fixed disk 45 and/or floppy disk drive 44. Floppy disk drive 44 provides a means whereby computing equipment 40 can access information, such as image data, computer-executable process steps, application programs, etc. stored on removable memory media. A similar CD-ROM interface (not shown) may be provided for computing equipment 40 through which computing equipment 40 can access information stored on removable CD-ROM media.

Printer 50 is a printer, preferably a color bubble jet printer, which forms color images on a recording medium such as paper or transparencies or the like. The invention is usable with other printers, however, so long as the printer is capable of being interfaced to computing equipment 40. In addition, digital color scanner 70 is provided for scanning documents and images into computing equipment 40 and digital color camera 60 is provided for sending digital images to computing equipment 40. Of course, computing equipment 40 may acquire digital image data from other sources such as a digital video camera or from a local area network or the Internet via network interface bus 80.

Figure 2:
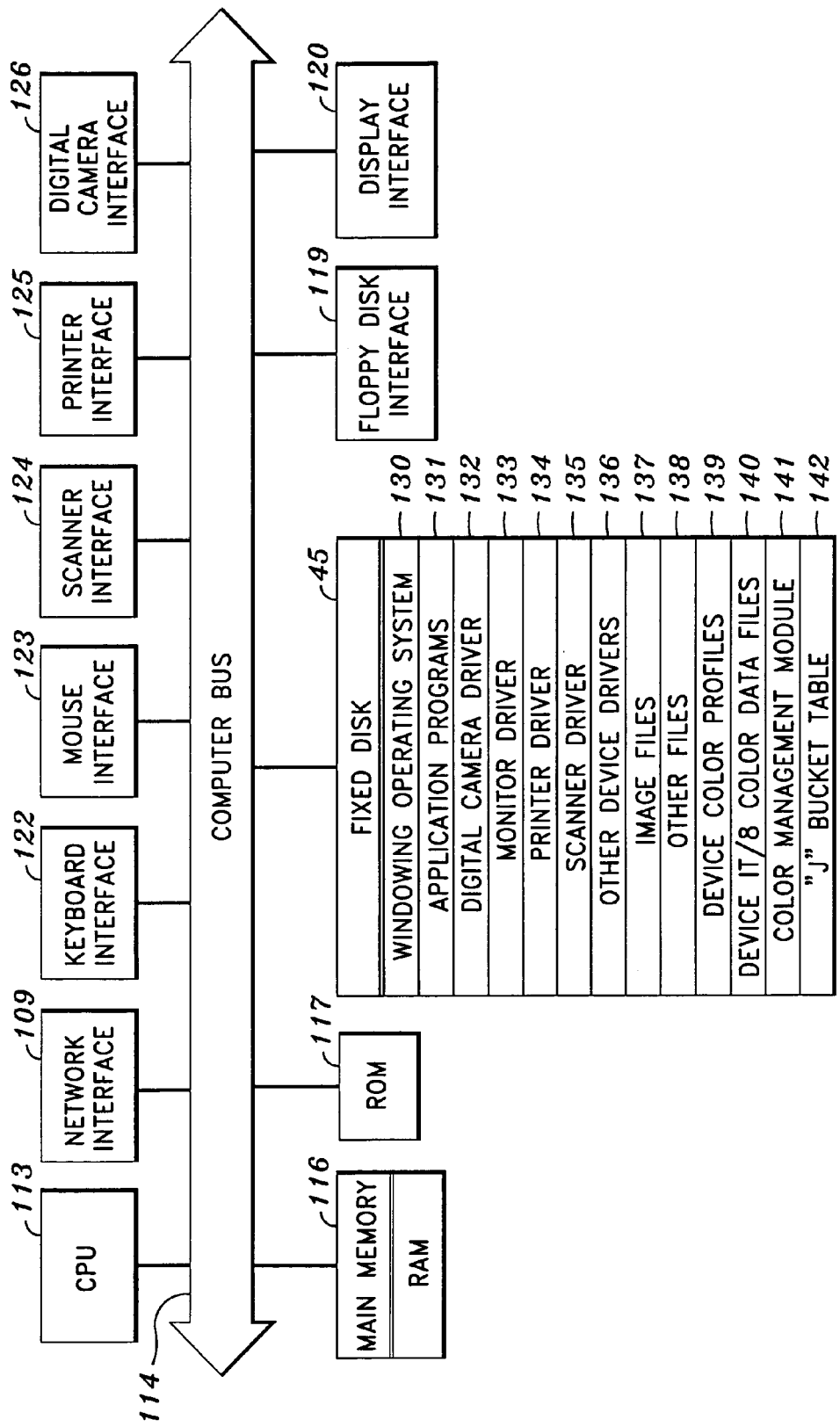
FIG. 2 is a detailed block diagram for explaining the internal architecture of the computer equipment shown in the computing environment of FIG. 1.

FIG. 2 is a detailed block diagram showing the internal architecture of host processor 41 of computing equipment 40. As shown in FIG. 2, host processor 41 includes central processing unit (CPU) 113 which interfaces with computer bus 114. Also interfacing with computer bus 114 are fixed disk 45, network interface 109, random access memory (RAM) 116 for use as main memory, read only memory (ROM) 117, floppy disk interface 119, display interface 120 to monitor 43, keyboard interface 122 to keyboard 46, mouse interface 123 to pointing device 47, scanner interface 124 to scanner 70, printer interface 125 to printer 50, and digital camera interface 126 to digital camera 60.

Main memory 116 interfaces with computer bus 114 so as to provide RAM storage to CPU 113 during execution of software programs such as an operating system, application programs and device drivers. More specifically, CPU 113 loads computer-executable process steps from fixed disk 45, another storage device, or some other source such as a network, into a region of main memory 116. CPU 113 then executes the stored process steps from main memory 116 in order to execute software programs such as an operating system, application programs and device drivers. Data such as color images can be stored in main memory 116, where the data can be accessed by CPU 113 during the execution of computer-executable process steps which use or alter the data.

As also shown in FIG. 2, fixed disk 45 contains operating system 130, which is preferably a windows-based operating system although other types of operating systems may be used, application programs 131, such as image processing applications that include a color management module, and plural device drivers, including a digital camera driver 132, monitor driver 133, printer driver 134, scanner driver 135, and other device drivers 136. Fixed disk 45 also includes image files 137, other files 138, device color profiles 139, which are discussed in more detail below, device IT8 color data files 140, which are also discussed in more detail below, and color management module 141 in which the present invention may be implemented. The functions of color management module 141 are preferably provided in the form of computer-executable process steps. As mentioned above, the functions of color management module 141 may be alternatively integrated in other forms, such as a preprogrammed dedicated color management device, or an application program for performing processing of color image data, such as one of application programs 131. Finally, also included on fixed disk 45 is "J" bucket table 142 which is used in the implementation of the invention during the generation of an inverse, device-independent to device-dependent, transformation look-up table. The details of "J" bucket table 142 are discussed in more detail below.

Figure 3:
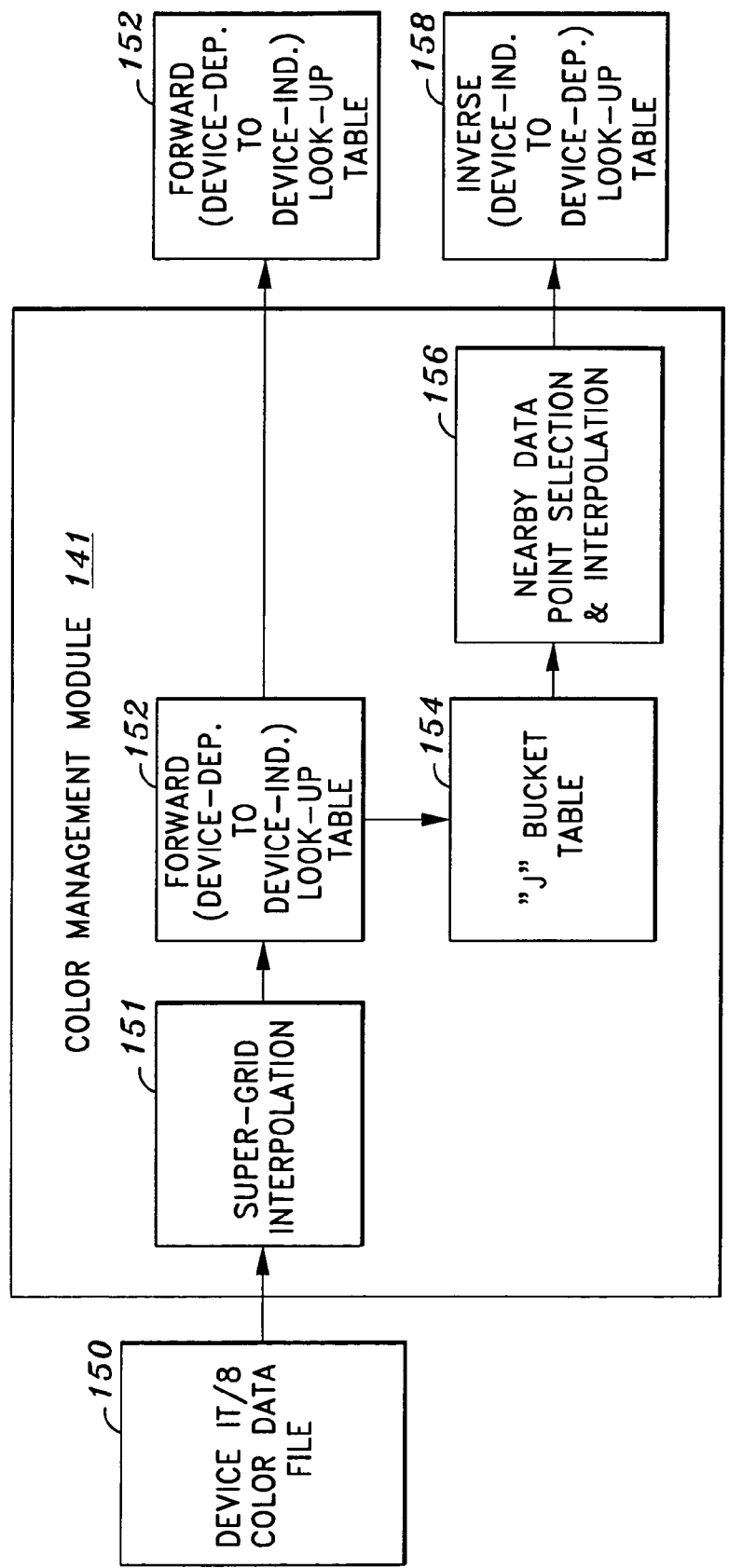
FIG. 3 is a block diagram for explaining the operation of a color management module according to one embodiment of the present invention.

FIG. 3 is a block diagram which depicts the implementation of the invention in a color management module according to one embodiment of the invention. As seen in FIG. 3, a color management module 141 is used to generate forward (device-dependent to device-independent) look-up table 152 and inverse (device-independent to device-dependent) look-up table 158 based on color measurement data contained in device IT/8 color data file 150. In this regard, although device IT/8 color data file 150 is shown in FIG. 3, color measurement data can be obtained from other sources such as one of device color profiles 139, or directly from measurement of a standardized color measurement target, such an IT8.7/3 target, corresponding to a particular color device such as a color printer.

In the example of a printer, an IT8.7/3 target typically contains a reasonably detailed sampling of all the CMYK (device-dependent) values at various levels of C, M, Y and K. Alternatively, a custom target with uniform sampling of the C, M, Y and K channels can be used. After the target is printed, a spectrophotometer or calorimeter can be used to measure the XYZ value of each patch, and the XYZ value can be converted to the Jab value using the CIECAM02 model. In this manner, a table of color measurement data comprised of corresponding pairs of CMYK and Jab values is created. For purposes of explanation of the embodiment shown in FIG. 3, it is assumed that such a table of color measurement data is contained in device IT/8 color data file 150.

As seen in FIG. 3, device IT/8 color data file 150 is accessed by color management module 141 and then super-grid interpolation 151 is applied to the color measurement data contained in device IT/8 color data file 150 to generate forward look-up table 152. The CMY sampling grids are generally different on each level of K in the color measurement data of device IT/8 color data file 150, and therefore a technique of super-grid sampling is used in super-grid interpolation 151 in order to obtain a more accurate and smooth transformation when using forward look-up table 152. The technique of super-grid sampling according to one embodiment of the present invention is discussed in more detail below.

Forward look-up table 152 is then sampled on a repeated basis using a predetermined sampling schedule in order to generate a list of CMYK-Jab data pairs with a desired spacing between sampled CMYK data points. The list of CMYK-Jab data pairs is referred to herein as "J"-bucket data table 154, and its construction and use are discussed in more detail below. The list of CMYK-Jab data pairs contained in "J"-bucket data table 154 is then sampled using determined Jab target points to create inverse look-up table 158 by using nearby point selection and interpolation 156. In this regard, nearby point selection and interpolation 156 populates inverse look-up table 158 in a specific predetermined order and, for each table entry to be populated, determines an appropriate interpolated device-dependent (CMYK) value to correspond to the device-independent (Jab) target value of the table entry. This determination is made according to the present invention by using a scattered data approach in which a predetermined number of neighboring interpolation points are selected from "J" bucket table 142 based on the target device-independent data point and then a particular form of weighted interpolation is utilized on the selected neighboring interpolation points. In this manner, the present invention has the advantage of smooth blending of points on the one hand, and on the other hand of retaining a reasonably small number of neighboring interpolation points so that dynamic run-time computation does not become overly expensive. Accordingly, the present invention generates a more accurate forward look-up table 152 and inverse look-up table 158 from color measurement data in a dynamic run-time environment without excessive use of computational resources. The foregoing techniques of selecting neighboring interpolation points and of performing a weighted interpolation on such selected points are discussed in more detail below.

Figure 4A:
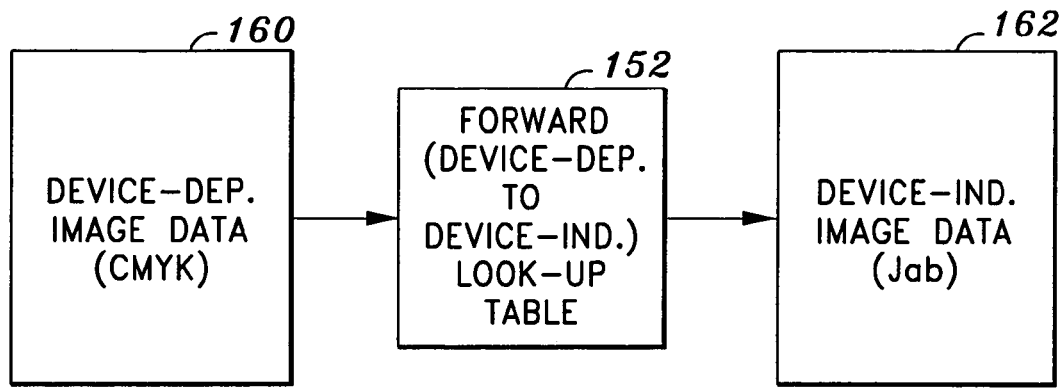
FIGS. 4A and 4B are block diagram is for explaining the use of look-up tables which are generated by the color management module shown in FIG. 3.
Figure 4B:
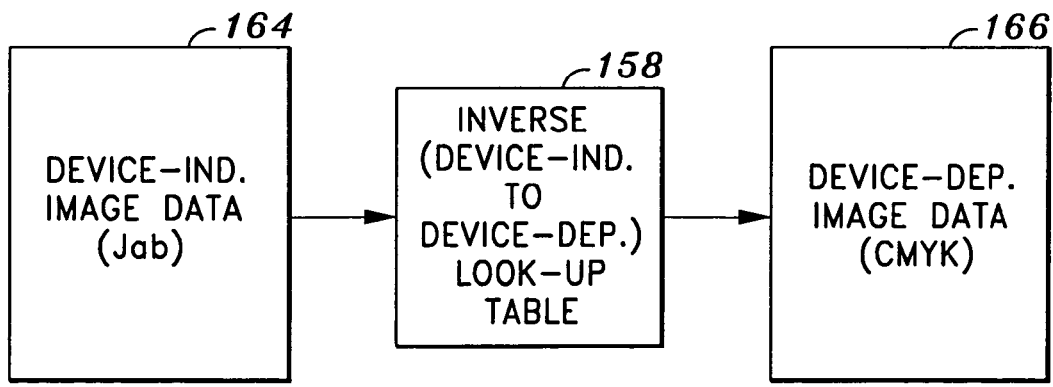

FIGS. 4A and 4B are block diagrams which depict the use of forward look-up table 152 and inverse look-up table 158 which were generated by color management module 141 as shown in FIG. 3. In FIG. 4A, it is seen that forward look-up table 152 is used to convert device-dependent image data 160 (in CMYK), such as data corresponding to an image that is in the color space of a color printer, to device-independent image data 162 (in Jab), such as image data in a standardized device-independent color space.

Similarly, FIG. 4B depicts the use of inverse look-up table 158 to convert device-independent image data 164 (in Jab), such as data corresponding to an image that is in a standardized device-independent color space, to device-dependent image data 166 (in CMYK), such as image data in the color space of a color printer. In this manner, the look-up tables that are created in on a dynamic, as-needed basis by color management module 141 can be immediately used by color management module 141 to perform color processing on color image data, such as to prepare the image data for printing on a color printer corresponding to the look-up tables.

Figure 5:
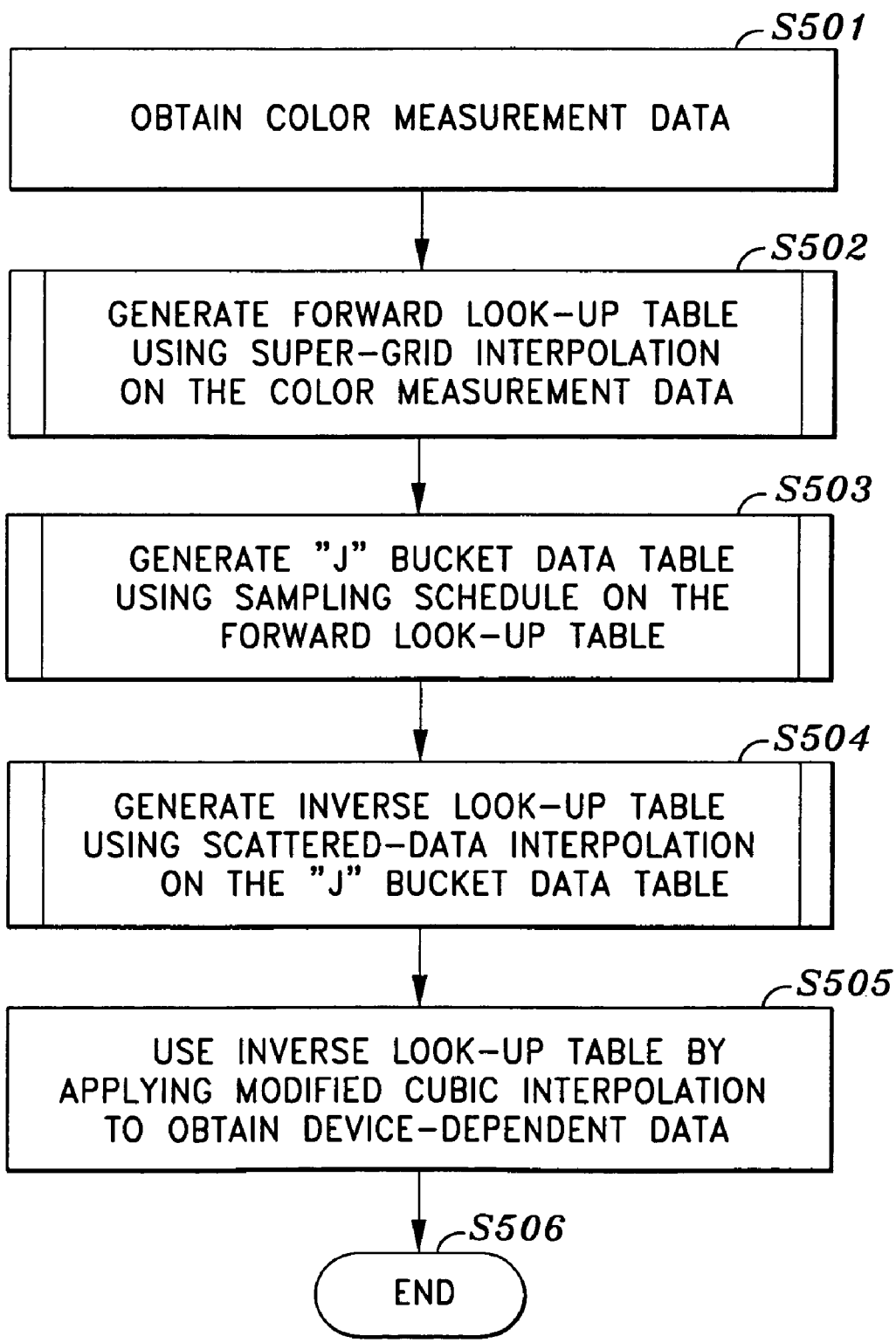
FIG. 5 is a flowchart for providing a detailed explanation of one embodiment of the present invention.

FIG. 5 is a flowchart for explaining an overall example of the implementation of the present invention to dynamically generate look-up tables based on color measurement data for a color printer, and then to use the generated inverse look-up table to transform image data to device-dependent image data for printing on the color printer.

Turning to FIG. 5, color measurement data is obtained in step S501, the color measurement data corresponding in this example to a color printer. As discussed above with respect to FIG. 3, the color measurement data can be obtained from device IT/8 color data file 150, or from another source. Next, in step S502, a forward look-up table is generated by using a super-grid interpolation on the color measurement data. The details of step S502 are explained in more detail below with respect to FIGS. 6 and 7. A "J" bucket data table is then generated in step S503 by applying a predetermined sampling schedule to repeatedly sample the generated forward look-up table. The details of step S503 are explained in more detail below with respect to FIGS. 8 and 9. An inverse look-up table is then generated by using a scattered-data interpolation in which a predetermined number of neighboring data points are selected for each target device-independent data point according to certain criteria, and then the selected neighboring data points are weight interpolated to obtain the corresponding target device-dependent data point value. The details of step S504 are explained in more detail below with respect to FIGS. 10 through 13.

In step S505, the generated inverse look-up table is used to transform image data into device-dependent image data by applying a modified cubic interpolation for neighboring values obtained from the inverse look-up table. The modified technique is used because of the fact that the spacing of the a and b components in the inverse look-up table depends on the given value of J. In particular, if the input Jab has the J value lying between I and I+1 level of the LUT, a value lying between $j_o$ and $j_o+1$ on ith J-level, between $j_1$ and $j_1+1$ on the (i+1)st J-level (bearing in mind that the spacing of a and b in the LUT depends on the value of i), and b value lying between $k_o$ and $k_o+1$ on the ith J-level, $k_1$ and $k_1+1$ on the (i+1)st J-level, then we define weights according to Equation 1 set forth below, where J(i) denotes the J value of the ith grid point on the J-axis, a(i,j) denotes the a value of the jth grid point on the a-axis at the ith J-level, and similarly b(i,j) denotes the b value of the jth grid point on the b-axis at the ith J-level.

$$wj = J - J(i)$$
$$wa_o = a - a(i, j_o)$$
$$wa_1 = a - a(i+1, j_1)$$
$$wb_o = b - b(i, k_o)$$
$$wb_1 = b - b(i+1, k_1) \quad \text{Equation 1}$$

Then the interpolant device-dependent value is defined by the formula shown below in Equation 2, where the equation should be interpreted as a vector equation, because there are 4 components, C, M, Y, K. The process then ends at step S506.

$$\begin{aligned}CMYK = &\ (1-wj)*(1-wa_o)*(1-wb_o)*LUT(i, j_o, k_o) + \\ &\ (1-wj)*(1-wa_o)*wb_o*LUT(i, j_o, k_o+1) + \\ &\ (1-wj)*wa_o*(1-wb_o)*LUT(i, j_o+1, k_o) + \\ &\ (1-wj)*wa_o*wb_o*LUT(i, j_o+1, k_o+1) + \\ &\ wj*(1-wa_1)*(1-wb_1)*LUT(i+1, j_1, k_1) + \\ &\ wj*(1-wa_1)*wb_1*LUT(i+1, j_1, k_1+1) + \\ &\ wj*wa_1*(1-wb_1)*LUT(i+1, j_1+1, k_1) + \\ &\ wj*wa_1*wb_1*LUT(i+1, j_1+1, k_1+1)\end{aligned} \quad \text{Equation 2}$$

Figure 6:
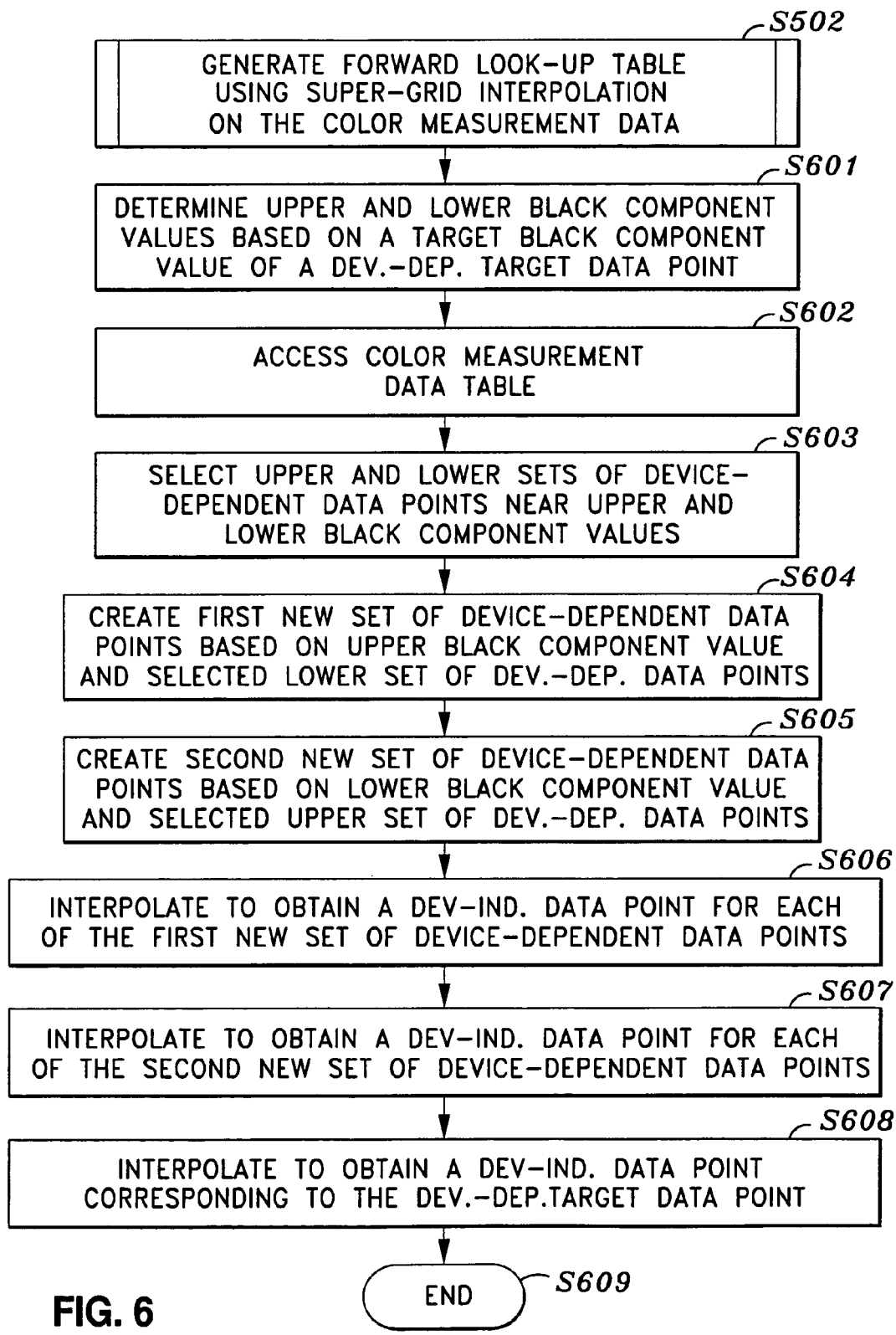
FIG. 6 is a flowchart for providing a detailed explanation of the step of generating a forward look-up table shown in FIG. 5.

The generation of the forward look-up table depicted in step S502 is explained in more detail in the flowchart of FIG. 6. As seen in FIG. 6, the super-grid interpolation of the color measurement data table (contained, for example, in device IT/8 color data file 150) starts by choosing a target device-dependent data point corresponding to an entry of the forward look-up table, and then determining an upper black component value (K) and a lower black component value (K) based on a predetermined spacing with respect to the black component value of the target device-dependent data point (step S601). The upper black component value corresponds to the nearest, higher K-level of data points in the color measurement data table which are immediately above the black component value of the target device-dependent data point. Similarly, the lower black component value corresponds to the nearest, lower K-level of data points in the color measurement data which are immediately below the black component value of the target device-dependent data point.

Figure 7:
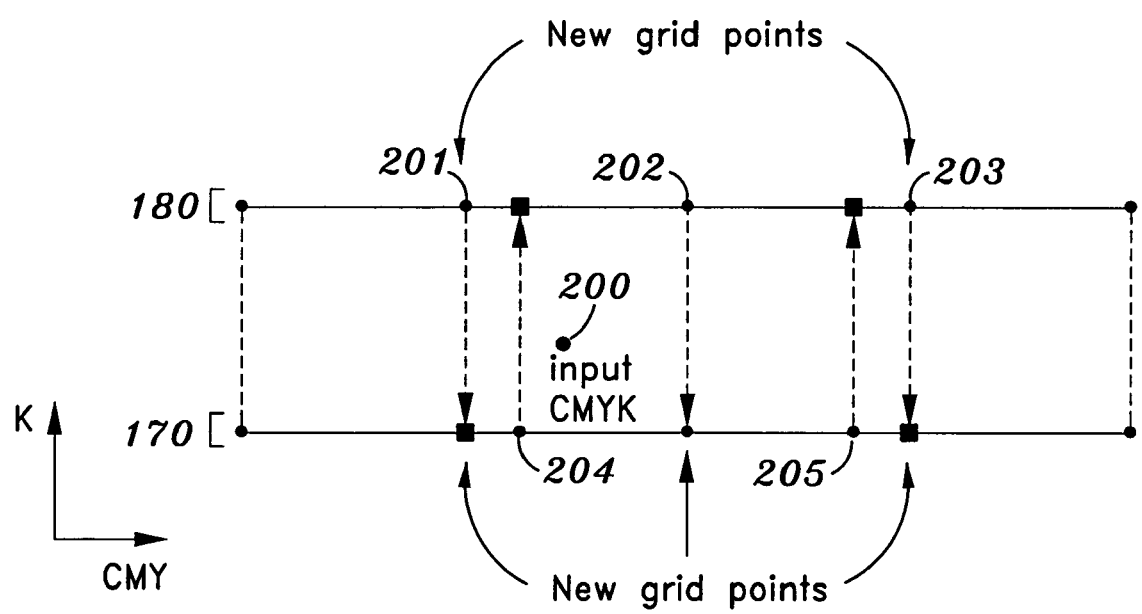
FIG. 7 is a diagram for depicting the use of a super-grid in the generation of a forward look-up table according to one embodiment of the present invention.

Next, in step S602, the color measurement data table is accessed in order to obtain an appropriate selection of data points at the K-levels corresponding to the upper and lower black component values. An illustration of the aforementioned K-levels in the color measurement data table is provided in FIG. 7. As seen in FIG. 7, upper black component value 180 and lower black component value 170 are shown within the color measurement data table of device IT/8 color data file 150. It can be seen that the spacing of the CMY data points at these different K-levels are different because the CMY sampling grids of the color target used to create the color measurement data table are generally different on each level of K. Device-dependent data target point 200 is shown to be spaced between the K-levels, and CMY data points 201 and 202 are shown to reside at upper black component value 180, while CMY data points 203, 204, 205 are shown to reside at lower black component value 180, within the color measurement data table. In addition, end points are also shown at each of the K-levels.

Returning to FIG. 6, an upper set of neighboring device-dependent data points (201, 202, 203) are selected from the color measurement data table which are within the vicinity of device-dependent target data point 200 at upper black component value 180, and a lower set of device-dependent data points (204, 205) are selected which are within the vicinity of device-dependent target data point 200 at lower black component value 170 (step S603). The number of data points selected within the vicinity of device-dependent target data point 200 can be determined by a preset number of nearest data points, by a restricted range within CMY space from which the data points are selected, or in some other manner.

Next, a super-grid is created by making a super-set of all selected data points at both the upper and lower K-levels. In particular, in step S604, a first new set of device-dependent data points is created at the K-level for upper black component value 180, each new data point having a black component value equal to upper black component value 180 and having a combination of color component values corresponding to a respective one of the selected lower set of device-dependent data points. In the example depicted in FIG. 7, the new upper data points correspond to lower device-dependent data points 204, 205. In a similar manner, in step S605, a second new set of device-dependent data points is created at the K-level for lower black component value 170, each new data point having a black component value equal to lower black component value 170 and having a combination of color component values,corresponding to a respective one of the selected upper set of device-dependent data points. In the example depicted in FIG. 7, the new lower data points correspond to upper device-dependent data points 201, 202, 203. Accordingly, in the example of FIG. 7, a super-set of seven device-dependent data points (including the end points) will be used at each K-level to determine an interpolated device-independent (Jab) value for the device-dependent target data point 200. Of course, only the originals of the selected upper and lower sets of device-dependent data points have corresponding device-independent (Jab) values in the color measurement data table. Of course, the number of "super-set" data points shown in FIG. 7 is for illustrative purposes, and it should be appreciated that a different number (other than seven) of data points can be used as a super-set at each K-level.

In this regard, for each of the first new set of device-dependent data points at upper black component level 180, an interpolation is performed between the device-independent (Jab) component values corresponding to the existing selected upper set of device-dependent data points, in order to obtain an interpolated device-independent data point for the new device-dependent data point at upper black component level 180 (step S606). Similarly, for each of the second new set of device-dependent data points at lower black component level 170, an interpolation is performed between the device-independent (Jab) component values corresponding to the existing selected lower set of device-dependent data points, in order to obtain an interpolated device-independent data point for the new device-dependent data point at lower black component level 170 (step S607).

Preferably, the interpolation method performed in steps S606 and S607 is a three-dimensional tetrahedral interpolation.

In this manner, a super-set of CMYK-Jab data point pairs are now available at the K-level immediately above device-dependent target data point 200, and a super-set of CMYK-Jab data point pairs are now available at the K-level immediately below device-dependent target data point 200, wherein each set of seven data point pairs are aligned with respect to each other in CMY space, thereby accounting for the differences in the spacing of the CMY sampling grids at each K-level inherent in the color measurement data from the color measurement target.

Next, an interpolated device-independent data point is calculated for device-dependent target data point 200 by performing an interpolation between the super-set of CMYK-Jab data point pairs at the upper K-level and the super-set of CMYK-Jab data point pairs at the lower K-level (step S608). Preferably, the interpolation method performed in step S608 is a four-dimensional tetrahedral interpolation. The process then ends in step S609. By virtue of the foregoing steps, a more accurate interpolated device-independent data point is obtained for each device-dependent target data point entry in the forward look-up table, thereby ensuring a more appropriate mapping from device-dependent color space (CMYK) to device-independent color space (Jab) when subsequently using the forward look-up table during color processing of image data.

Figure 8:
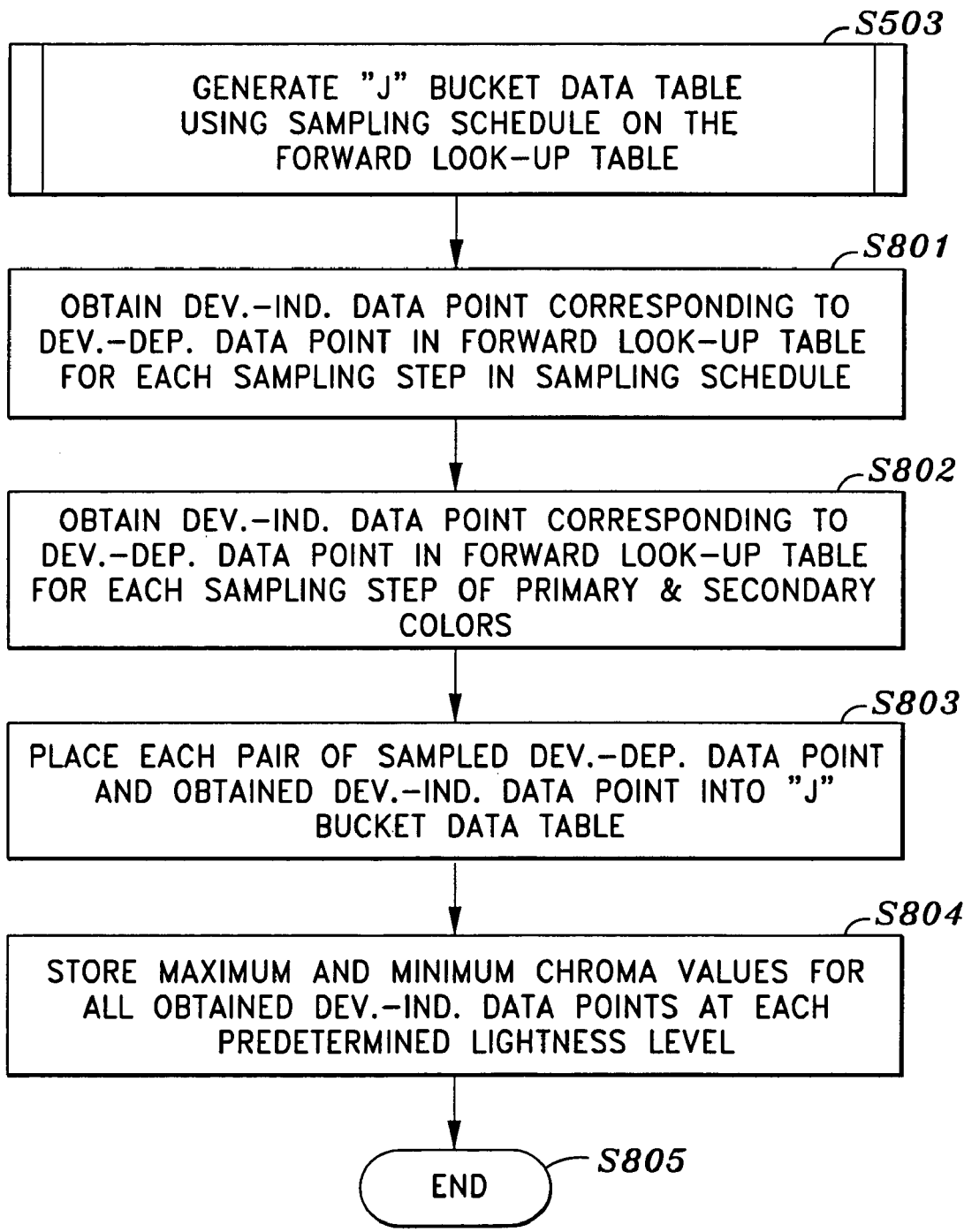
FIG. 8 is a flowchart for providing a detailed explanation of the step of generating a table of data points shown in FIG. 5.

FIG. 8 is a flowchart which explains in more detail step S503 of FIG. 5 in which the "J" bucket data table is generated. In step S801, a predetermined sampling schedule is applied to repeatedly sample the forward look-up table generated in step S502, thereby obtaining a device-independent (Jab) data point corresponding to each sampled device-dependent data point according to the sampling schedule. In this regard, FIG. 9 depicts an example of a scheduling )sample that may be used according to one embodiment of the invention during the generation of the "J" bucket data table. As seen in FIG. 9, column 210 represents the lightness component (K) of the device-dependent (CMYK) data points, column 211 represents the color components of the device-dependent (CMYK) data points, and column 212 represents the desired sampling step according to the ranges provided under columns 210 and 211. In this manner, the spacing of the sample points is varied depending on a given location in the lightness range (K) and the chroma range (CMY). It can be seen in FIG. 9 that sampling in the first 20% of the lightness range is more frequent than in the last 55% of the lightness range. For example, the sampling step frequency is every 1% for data points having a K value in the first 20% of the lightness range and CMY values in the first 10% of the chroma range. In contrast, the sampling step frequency is every 10% for data points having a K value beyond 45% of the lightness range, regardless of the CMY values.

In step S802, the forward look-up table generated in step S502 is further repeatedly sampled to obtain a device-independent (Jab) data point corresponding to each sampled device-dependent data point along the primary color (CMY) and secondary color (RGB) ranges. Preferably the sampling step for this sampling of primary and secondary colors is every 1% from 0% to 100%. Next, each pair of sampled device-dependent data point and corresponding device-independent data point obtained in steps S801 and S802 are placed into the "J" bucket data table (step S803). Thus, the "J" bucket data table is comprised of CMYK-Jab data pairs obtained from the generated forward look-up table by using desired sampling steps within the forward look-up table. The "J" bucket data table can then be used in an efficient manner during generation of the inverse look-up table.

In addition to the sampled data point pairs mentioned above, the maximum and minimum device-independent chroma values (a and b) of all sampled device-independent data points is stored for each level of lightness (J). According to one embodiment of the invention, the stored chroma values are stored in a 2-dimensional array ab_bounds[101][4], so that for each $0 \leq J \leq 100$:

ab_bounds[J][0]=the point in the J-bucket with maximum a on this J level ab_bounds[J][1]=the point in the J-bucket with minimum a on this J level ab_bounds[J][2]=the point in the J-bucket with maximum b on this J level ab_bounds[J][3]=the point in the J-bucket with minimum b on this J level.

These stored chroma values represent the chroma range at each level of lightness for the corresponding color device, and are subsequently used during the generation of the inverse look-up table. The process then ends at step S805.

Figure 10:
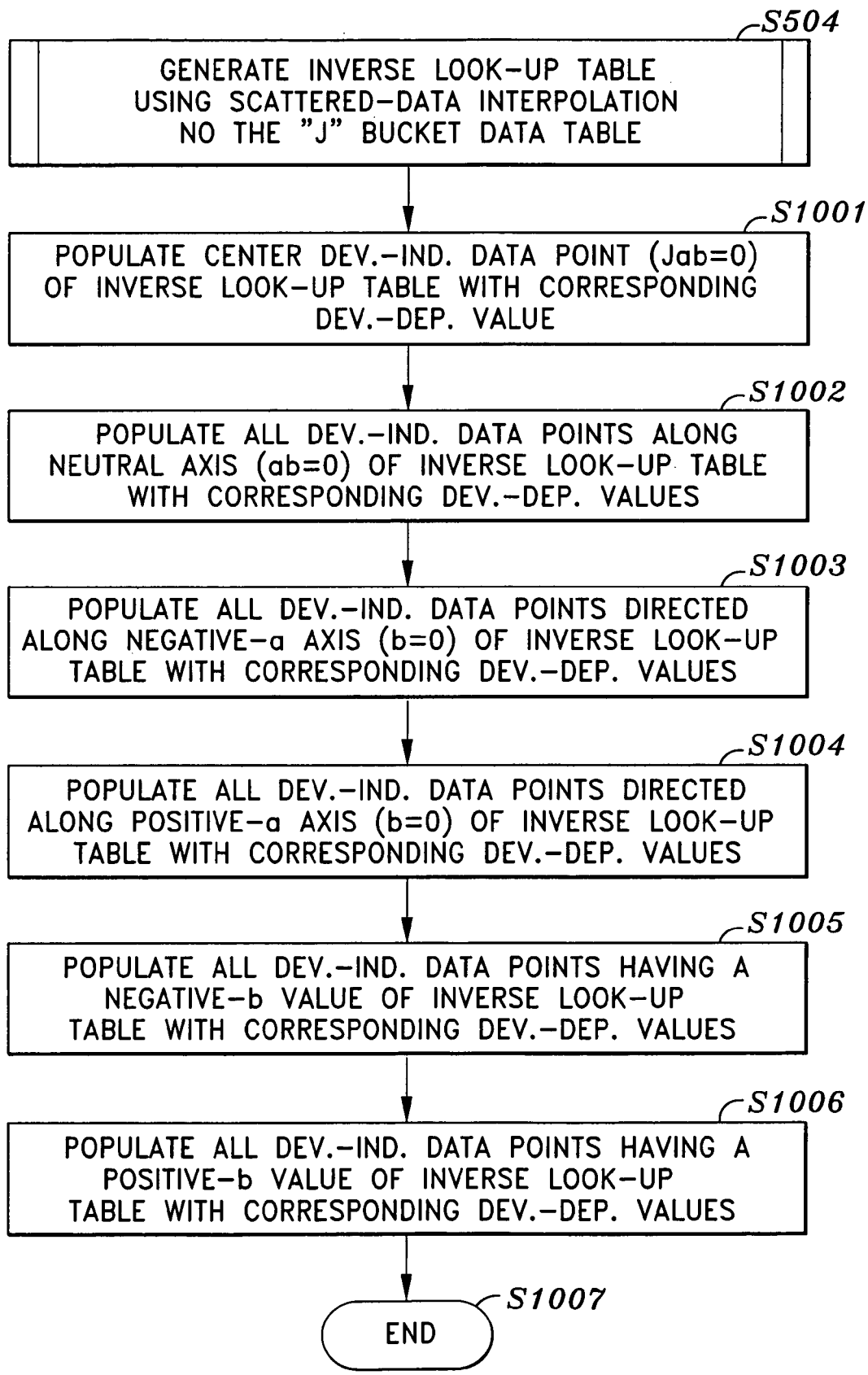
FIG. 10 is a flowchart for providing a detailed explanation of an order of table population during the step of generating an inverse look-up table shown in FIG. 5.
Figure 11:
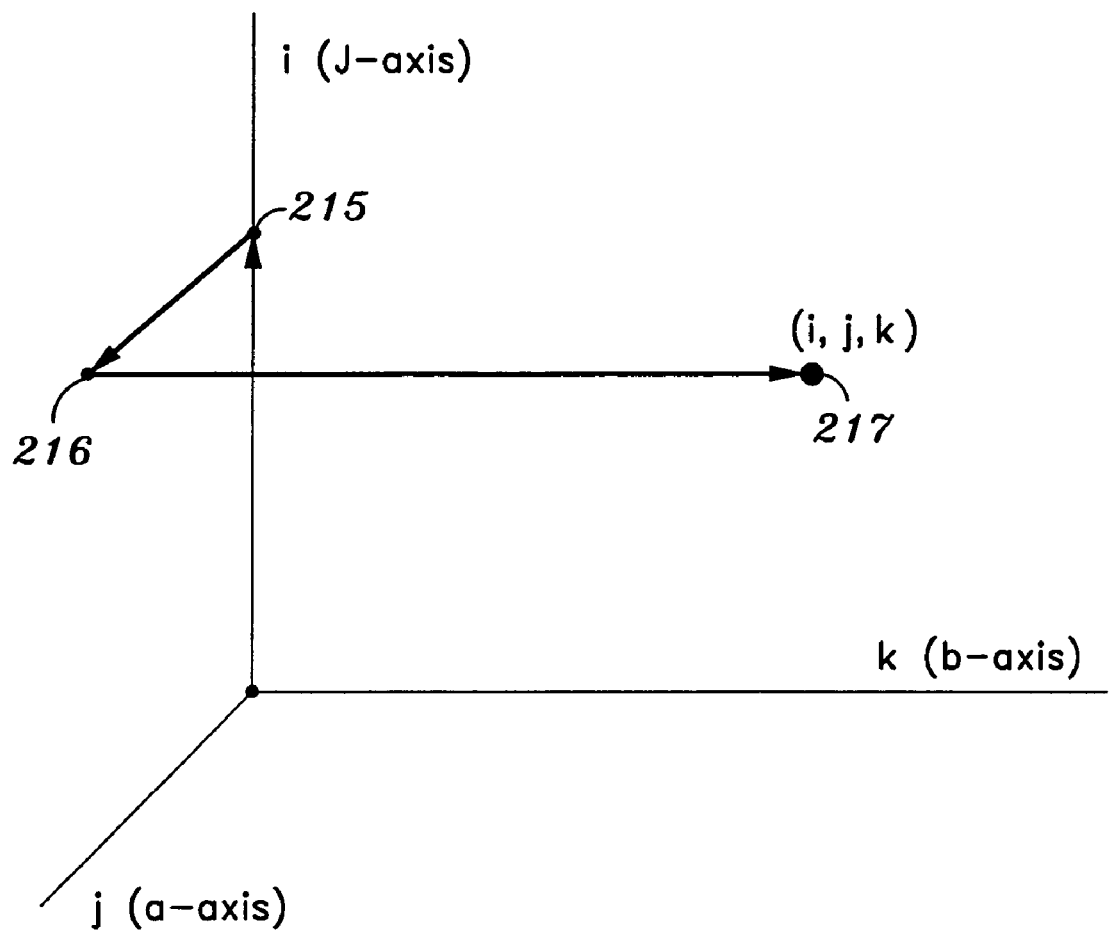
FIG. 11 is a graph which depicts the order of table population during the step of generating an inverse look-up table shown in FIG. 5.

FIG. 10 is a flowchart for providing a detailed explanation of an order of table population which is used during step S504 of generating an inverse look-up table as shown in FIG. 5. The calculation of the device-dependent data point values entered into the populated table entries is explained in detail with respect to FIGS. 12 and 13. FIG. 11 generally depicts a "path" of the order of population of the inverse look-up table. As seen in FIG. 11, data points are populated from the center, then up the J-axis, then outward along the a-axis, and finally outward along the b-axis. So, for example, the populated data point 217 depicted in FIG. 11 illustrates that all data points having a J-value less than point 215, an a-value less than point 216, and a k-value less than point 217 have already been populated.

Turning to FIG. 10, in step S1001 the center of the inverse look-up table is populated with a corresponding device-dependent value. In particular, the example of an inverse look-up table described herein has 17 entry points for each color component. In such an example, the (0, 8, 8) entry of the inverse look-up table is populated with the CMYK value of the black point, which represents J=a=b=0 in the Euclidean distance of the Jab space. Of course, it should be appreciated that different-sized look-up tables are also supported by the present invention. For example, for a look-up table having 32 entry points for each color component, then the table entry (0,16,16) corresponds to J=a=b=0 in Jab space. Next, all table entries corresponding to device-independent data points along the neutral axis (a,b=0) are populated (step S1002). In particular, the (i, 8, 8) entry points are populated, where $1 \leq i \leq 16$, in the order of increasing i-values. In step S1003, all table entries corresponding to device-independent data points along the negative-a axis are populated. In particular, for each $0 \leq i \leq 16$, populate the negative a-axis of the inverse look-up table (i, j, 8) where $0 \leq j \leq 7$, in the order of decreasing j. In step S1004, all table entries corresponding to device-independent data points along the positive-a axis are populated. In particular, for each $0 \leq i \leq 16$, populate the positive a-axis of the inverse look-up table (i, j, 8) where $9 \leq j \leq 16$, in the order of increasing j.

Next, all table entries corresponding to device-independent data points outward along the negative-b axis are populated (step S1005). In particular, for each $0 \leq i \leq 16$, $0 \leq j \leq 16$, populate all points having negative-b values of the inverse look-up table (i, j, k) where $0 \leq k \leq 7$, in the order of decreasing k. Finally, all table entries corresponding to device-independent data points outward along the positive-b axis are populated (step S1006). In particular, for each $0 \leq i \leq 16$, $0 \leq j \leq 16$, populate all points having positive-b values of the inverse look-up table (i, j, k) where $9 \leq k \leq 16$, in the order of increasing k. The process then ends in step S1007.

Figure 12:
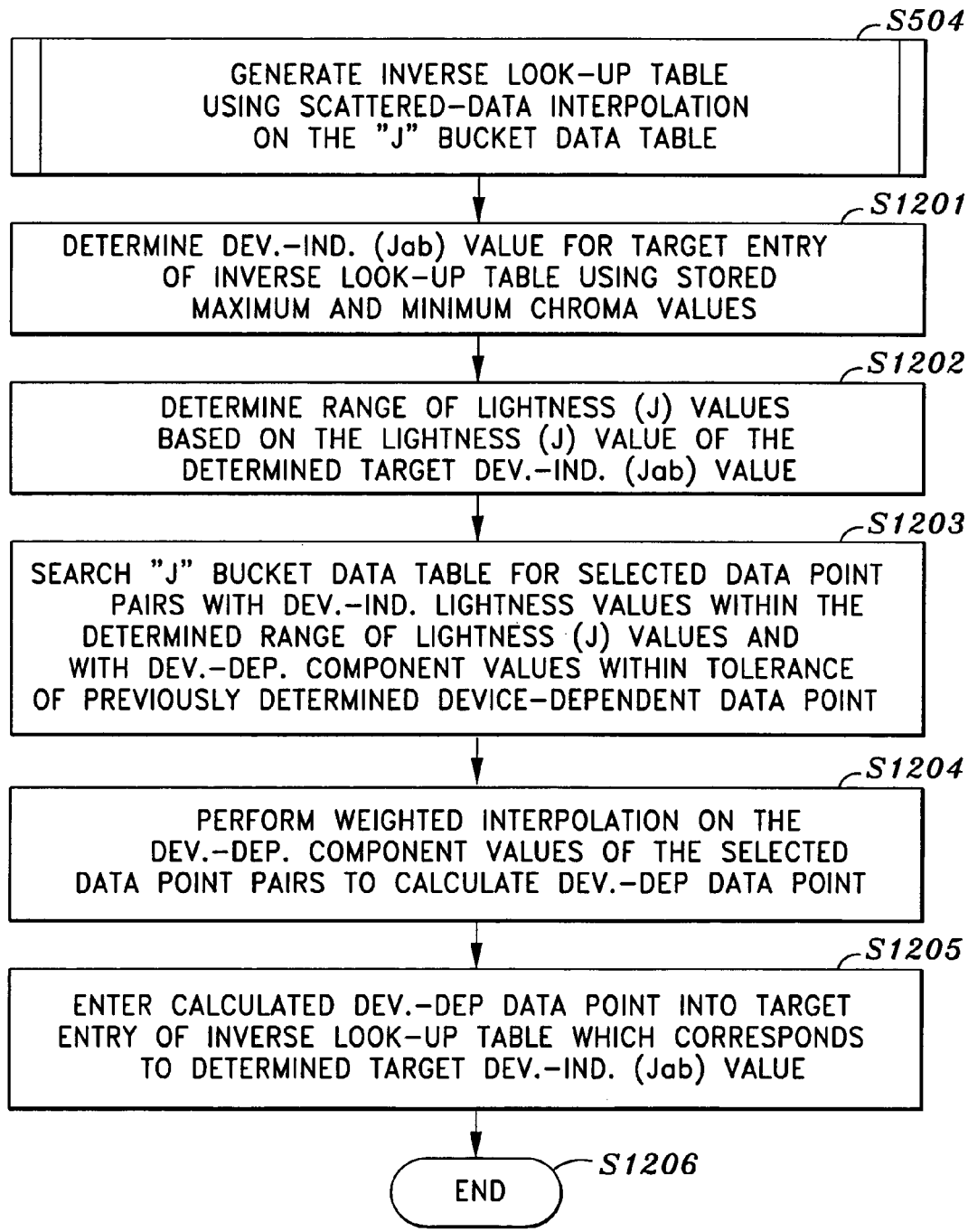
FIG. 12 is a flowchart for providing a detailed explanation of determining a device-dependent value for a populated data point during the step of generating an inverse look-up table shown in FIG. 5.

FIG. 12 is a flowchart for explaining the calculation of the device-dependent data point values entered into the populated table entries during the generation of an inverse look-up table shown in step S504 of FIG. 5. In step S1201, a device-independent data point value is determined for a target entry of the inverse look-up table based on the stored maximum and minimum chroma values. This is because, as mentioned above with respect to step S804 of FIG. 8, the chroma range (a,b) of the color printer gamut varies with each lightness level (J). So, in accordance with the population order discussed above, each particular device-independent target value is determined according to the particular location of the table entry being populated. In particular, for a given (i,j,k), where $0 \leq i, j, k \leq 16$, the corresponding Jab value as given by Equation 3 set forth below.

$$J = i * 100 / 16 \quad \text{Equation 3}$$

$$a = \begin{cases} (8-j) * (a \text{ value of ab\_bounds}[J][1]\text{th point})/8 \\ \text{if } 0 \leq j \leq 8 \\ (j-8) * (a \text{ value of ab\_bounds}[J][0]\text{th point})/8 \\ \text{if } 9 \leq j \leq 16 \end{cases}$$

$$b = \begin{cases} (8-k) * (b \text{ value of ab\_bounds}[J][3]\text{th point})/8 \\ \text{if } 0 \leq k \leq 8 \\ (k-8) * (b \text{ value of ab\_bounds}[J][2]\text{th point})/8 \\ \text{if } 9 \leq j \leq 16 \end{cases}$$

Once the target Jab point value is determined for the particular table entry point, a range of lightness (J) values is determined based on the lightness (J) value of the target Jab point value (step S1202). In general, The goal is to find a predetermined number of neighboring points in the "J" bucket data table near the target Jab point in each of the 8 coordinate octants. In the example discussed herein, the predetermined number of neighboring points is eight, one for each octant, although other numbers can be used. Accordingly, each data point pair in the J-bucket data table having a device-independent data point J-value within the determined range of lightness (J) values is identified (step S1203). In the example discussed herein, the determined range is J−3 to J+3, where J is the lightness value of the target Jab point value. Of course, other values of determined J-range can be used, and the J-range can be either predetermined or determined "on-the-fly" in real time.

Figure 13:
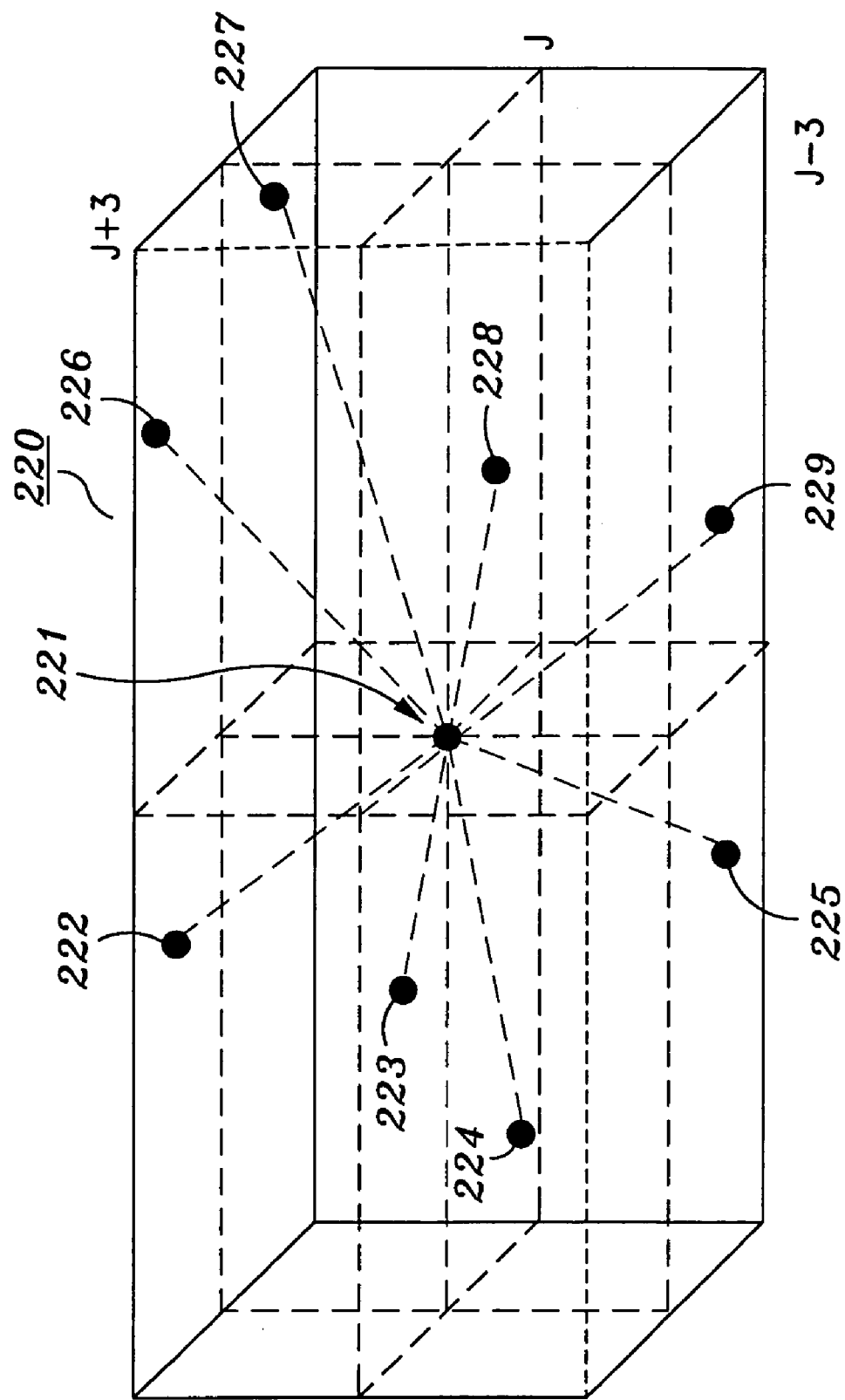
FIG. 13 is a block diagram for explaining the selection of neighboring data points for use in the determination of a device-dependent value for a populated data point during the step of generating an inverse look-up table shown in FIG. 5.

FIG. 13 is a diagram spatially depicting device-independent data points (222 to 229) selected from the J-bucket data table which are within the determined range of lightness (J) values, along with their respective locations in the eight Jab coordinate octants surrounding target Jab point value 221. Preferably, one nearest data point to target Jab point value 221 in each octant is selected for use in interpolation to calculate a device-dependent value corresponding to target Jab point value 221.

In addition, for maximum efficiency, the data point pairs from the "J" bucket data table in each of these ranges can be identified initially prior to the beginning of the first search, so that they are readily available for all subsequent searches.

In detail, for any input Jab point, it is first checked if the range of particular J values has been constructed previously. If not, then the range is constructed by a brute force search through the whole "J" bucket data table, and the result is stored so it can be re-used later when another target Jab point with the same J value occurs.

Returning to FIG. 12, of the data point pairs in the J-bucket data table having a device-independent data point J-value within the determined range of lightness (J) values (in step S1203), only those data point pairs are selected which have corresponding device-dependent component (CMYK) values which are within a predetermined tolerance of the previously-determined CMYK value. This helps to control smoothness from point to point in the table entries of the inverse look-up table. In particular, the tolerance level (TOL) is preferably 0.05 of the maximum device value, which is 255, in each of the C, M, Y, K channels, although other values for TOL can be used, and the TOL value can be dynamically determined "on-the-fly" in real time. More precisely, the following condition of Equation 4 must also be satisfied in step S1203:

|C of last populated point−C of point in question|$\leq TOL*255$

|M of last populated point−M of point in question|$\leq TOL*255$

|Y of last populated point−Y of point in question|$\leq TOL*255$

|K of last populated point−K of point in question|$\leq TOL*255/2$      Equation 4

In this regard, the smaller tolerance on the K channel calls for greater smoothness in this channel. If not all eight points (one from each octant) can be found, then the selection process of step S1203 is repeated with a higher TOL that is 0.05 higher than the previous one, but with the extra condition that if a point has already been chosen in the octant from the previous iteration, it will not be replaced (even if the current point may be closer in distance, the smaller TOL is favored). If again not all eight points can be found, the process of step S1203 is repeated with a higher TOL until TOL exceeds 0.95. At the end of the process, we will have possibly from 1 to eight points chosen.

Next, in step S1204, a weighted interpolation is performed on the device-dependent component values corresponding to the selected device-independent data points from step S1203 in order to calculate a device-dependent data value corresponding to the target Jab point value. If only less than four data points are selected, the CMYK value corresponding to the closest point from the target Jab point value is used as the device-dependent data value (CMYK) corresponding to the target Jab point value. If the number of selected data points is from four to eight points, then we obtain the device-dependent data value (CMYK) is obtained by the Shepard interpolation method. In particular, if the ith chosen point has $C_i M_i Y_i K_i$ as the CMYK value and $P_i = (J_i, a_i, b_i)$ as the Jab point in Jab space, and i0 corresponds to the point most distant from the input point P=(J,a,b) then the device-dependent data value (CMYK) is obtained according to Equation 5, set forth below:

$$D_i = \|P - P_i\| = \sqrt{(J - J_i)^2 + (a - a_i)^2 + (b - b_i)^2} \quad \text{Equation 5}$$

-continued $$w'_i = \frac{(D_{i0} - D_i)^2}{D_{i0}^2 D_i^2}$$

$$w_i = w'_i \Big/ \sum_k w'_k$$

$$C = \sum_i w_i C_i$$

$$M = \sum_i w_i M_i$$

$$Y = \sum_i w_i Y_i$$

$$K = \sum_i w_i K_i$$

The calculated device-dependent data value (CMYK) is then entered into the target entry of the inverse look-up table in correspondence with the target Jab point value (step S1205). The process then ends at step S1206. In this manner, all table entries of the inverse look-up table are populated in a predetermined order with device-dependent (CMYK) values. In particular, by judiciously choosing an optimal number of points from the eight neighboring octants, the invention provides a way to benefit from: (1) the advantages of scattered data interpolation methods, which include robustness to errors of individual data points, and freedom from any assumption regarding the geometric arrangement of points; and (2) the advantage of efficiency of computation, which involves a relatively small number of interpolation points.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method for creating a look-up table which converts color image data from a device-dependent color space to a device-independent color space, the method comprising the steps of:

determining an upper black component value which is a predetermined amount above a target black component value of a device-dependent target data point, and a lower black component value which is a predetermined amount below the target black component value of the device-dependent target data point;

accessing a color measurement data table which contains device-independent component values in respective correspondence to device-dependent data points;

selecting, from the color measurement data table, an upper set of device-dependent data points which are within the vicinity of the device-dependent target data point at the upper black component value, and a lower set of device-dependent data points which are within the vicinity of the device-dependent target data point at the lower black component value;

creating a first new set of device-dependent data points, each of which having a black component value equal to the upper black component value and having a combination of color component values corresponding to a respective one of the selected lower set of device-dependent data points;

creating a second new set of device-dependent data points, each of which having a black component value equal to the lower black component value and having a combination of color component values corresponding to a respective one of the selected upper set of device-dependent data points;

interpolating, for each of the first new set of device-dependent data points, device-independent component values that correspond to immediately adjacent device-dependent data points from the selected upper set of device-dependent data points, to obtain an interpolated device-independent data point at the upper black component level;

interpolating, for each of the second new set of device-dependent data points, device-independent component values that correspond to immediately adjacent device-dependent data points from the selected lower set of device-dependent data points, to obtain an interpolated device-independent data point for the corresponding new device-dependent data points; and interpolating between the device-independent component values which correspond to each of the selected upper set of device-dependent data points, the first new set of device-dependent data points, the selected lower set of device-dependent data points and the second new set of device-dependent data points, to obtain an interpolated device-independent data point corresponding to the device-dependent target data point.

2. A method according to claim 1, wherein the steps of interpolating for each of the first and second new sets of device-dependent data points are three-dimensional interpolations, and wherein the step of interpolating between the device-independent component values is a four-dimensional interpolation.

3. An apparatus for creating a look-up table which converts color image data from a device-dependent color space to a device-independent color space, comprising:

determining means for determining an upper black component value which is a predetermined amount above a target black component value of a device-dependent target data point, and a lower black component value which is a predetermined amount below the target black component value of the device-dependent target data point;

accessing means for accessing a color measurement data table which contains device-independent component values in respective correspondence to device-dependent data points;

selecting means for selecting, from the color measurement data table, an upper set of device-dependent data points which are within the vicinity of the device-dependent target data point at the upper black component value, and a lower set of device-dependent data points which are within the vicinity of the device-dependent target data point at the lower black component value;

first creating means for creating a first new set of device-dependent data points, each of which having a black component value equal to the upper black component value and having a combination of color component values corresponding to a respective one of the selected lower set of device-dependent data points;

second creating means for creating a second new set of device-dependent data points, each of which having a black component value equal to the lower black component value and having a combination of color component values corresponding to a respective one of the selected upper set of device-dependent data points;

first interpolating for interpolating, for each of the first new set of device-dependent data points, device-independent component values that correspond to immediately adjacent device-dependent data points from the selected upper set of device-dependent data points, to obtain an interpolated device-independent data point at the upper black component level;

second interpolating means for interpolating, for each of the second new set of device-dependent data points, device-independent component values that correspond to immediately adjacent device-dependent data points from the selected lower set of device-dependent data points, to obtain an interpolated device-independent data point for the corresponding new device-dependent data points; and third interpolating means for interpolating between the device-independent component values which correspond to each of the selected upper set of device-dependent data points, the first new set of device-dependent data points, the selected lower set of device-dependent data points and the second new set of device-dependent data points, to obtain an interpolated device-independent data point corresponding to the device-dependent target data point.

4. A computer-readable memory medium having computer-executable process steps stored thereon, which are executable to create a look-up table which converts color image data from a device-dependent color space to a device-independent color space, wherein said process steps comprise:

a determining step to determine an upper black component value which is a predetermined amount above a target black component value of a device-dependent target data point, and a lower black component value which is a predetermined amount below the target black component value of the device-dependent target data point;

an accessing step to access a color measurement data table which contains device-independent component values in respective correspondence to device-dependent data points;

a selecting step to select, from the color measurement data table, an upper set of device-dependent data points which are within the vicinity of the device-dependent target data point at the upper black component value, and a lower set of device-dependent data points which are within the vicinity of the device-dependent target data point at the lower black component value;

a first creating step to create a first new set of device-dependent data points, each of which having a black component value equal to the upper black component value and having a combination of color component values corresponding to a respective one of the selected lower set of device-dependent data points;

a second creating step to create a second new set of device-dependent data points, each of which having a black component value equal to the lower black component value and having a combination of color component values corresponding to a respective one of the selected upper set of device-dependent data points;

a first interpolating step to interpolate, for each of the first new set of device-dependent data points, device-independent component values that correspond to immediately adjacent device-dependent data points from the selected upper set of device-dependent data points, to obtain an interpolated device-independent data point at the upper black component level;

a second interpolating step to interpolate, for each of the second new set of device-dependent data points, device-independent component values that correspond to immediately adjacent device-dependent data points from the selected lower set of device-dependent data points, to obtain an interpolated device-independent data point for the corresponding new device-dependent data points; and a third interpolating step to interpolate between the device-independent component values which correspond to each of the selected upper set of device-dependent data points, the first new set of device-dependent data points, the selected lower set of device-dependent data points and the second new set of device-dependent data points, to obtain an interpolated device-independent data point corresponding to the device-dependent target data point.

* * * * *